United States Patent [19]  
Cook

[11] Patent Number: 4,808,049  
[45] Date of Patent: Feb. 28, 1989

[54] CAM ACTUATED COLLET TOOL HOLDER

[76] Inventor: Harold D. Cook, 33642 Via Martos, Dana Point, Calif. 92629

[21] Appl. No.: 85,049

[22] Filed: Aug. 13, 1987

[51] Int. Cl.⁴ ............................................. B23B 31/20
[52] U.S. Cl. .................................. 409/234; 279/1 N; 279/1 T; 279/46 R; 408/240
[58] Field of Search ............... 279/41 R, 46 R, 1 N, 279/1 T, 1 TE, 42, 43, 47, 48, 50; 408/238, 239 R, 240; 409/232, 234; 407/44, 73, 77, 87, 97, 36, 38, 39, 92

[56] References Cited

U.S. PATENT DOCUMENTS 1,658,504 2/1928 Weiss ..................................... 279/43  
2,729,458 1/1956 Sacrey .................................... 279/41  
4,274,774 6/1981 Haga et al. ........................... 409/232

FOREIGN PATENT DOCUMENTS 921522 3/1963 United Kingdom ................. 279/46

Primary Examiner—Gil Weidenfeld  
Assistant Examiner—Steven C. Bishop  
Attorney, Agent, or Firm—Stetina and Brunda

[57] ABSTRACT

An improved collet tool holder is disclosed characterized by use of formed cam surfaces upon the collet and tightening sleeve of the tool holder. Selective rotation of the sleeve relative to the collet causes selective, ramping, engagement of the complementary cam surfaces which causes selective compression of the collet to securely grip a cutting tool. The collet's internal aperture may optionally present a formed cam surface which engages a complementary cam surface formed upon the shank of the cutting tool.

9 Claims, 2 Drawing Sheets

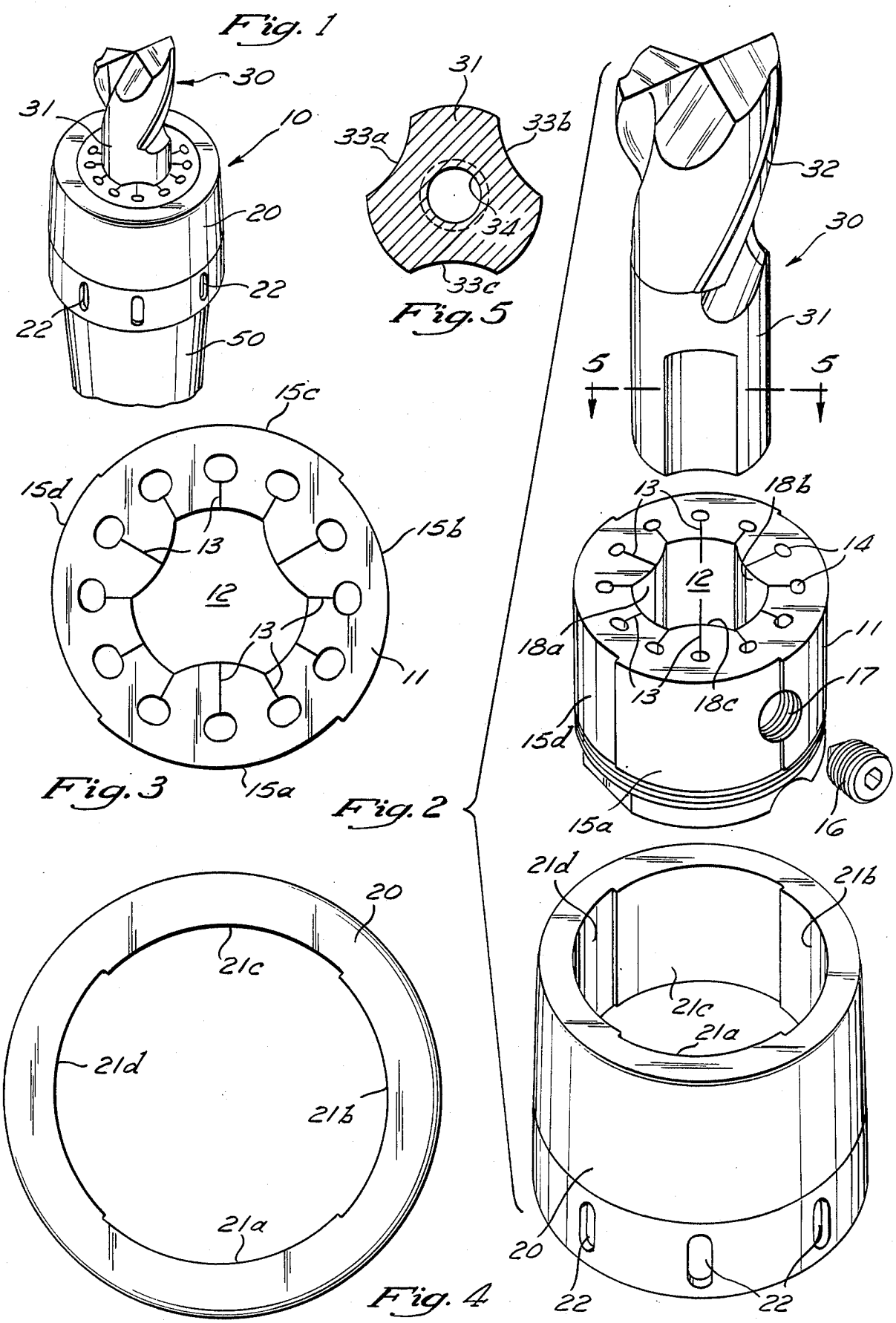

CAM ACTUATED COLLET TOOL HOLDER

BACKGROUND OF THE INVENTION

1. Field of the Invention

The present invention generally concerns tool holders or chucks, employing collets and more particularly concerns heavy duty chucks usable in milling machines and other machine tools which insure concentricity of the cutting tool and eliminate twisting and cutting tool movement within the chuck during operation.

2. Background of the Invention

Several types of heavy duty chucks for milling machines and other machine tools are in common use. One prior art type of machine tool, or milling, chuck employs a taper collet system. This system may either be of the conventional screw type or of the ballscrew type. Another prior art type of chuck employs a roll-rock or a roll-lock taper collet system. The principle of those chucks is that a collet formed substantially in the shape of a frusto-conical member exhibits an external taper in its axial length, which is compressed about a tool shank by being tightened with a sleeve, or nut. The prior art types of taper collet system chucks vary in gripping power.

Gripping power is an important, although not the only, measure of chuck performance. For chucks receiving tool shanks of 1.25" diameter the maximum gripping power force of the chuck is developed at an approximate depth of 1+inch within such chuck. For a taper collet milling chuck system of the conventional screw type the maximum gripping power is approximately 500 foot pounds. For a taper collet milling chuck system of the ballscrew type the maximum gripping power is approximately 1,000 foot pounds.

A desire to grip tools tighter in order that more torque may be transmitted thereto has resulted in tapered collet milling chucks which are improved over the conventional screw and ballscrew types. A conventional taper collet system roll-rock type milling chuck is capable of exerting an approximate 1,810 foot pounds of torque on a 1.25" diameter tool shank. A particular BIG-SHEPARD Gold-Power Milling Chuck (GMC) is capable of exerting a maximum gripping power of approximately 2,170 foot pounds. This particular high performance chuck employs a collet having a number of narrow and deep axial slots at the interior circumference of the collet. When a roll-lock type external sleeve is screwed upon the tapered external surface of the collet, the collet is compressed along its slots and very tightly grips the tool shank.

Although conventional system roll-rock type milling chucks and BIG-SHEPARD roll-lock type milling chucks both exhibit high gripping power, they suffer from some limitations. Howsoever strong the gripping power is within these chucks, even chucks employing slotted collets, when they are used to grip a completely cylindrical straight shank by compressive friction force then the gripping power developed will communicate less torque than is communicable through conventional side lock and threaded-shank tool holders. Therefore it would be desirable if the high torque transmission capabilities, and safety, of side lock and/or threaded-shak tool holders could somehow be combined with the ease of use of high gripping force chucks employing slotted collets.

In addition, the prior art tool holders or chucks typically do not ensure concentricity of the cutting tool within the tool holder, nor positively prevent tool twisting or axial movement within the tool holder. As such, cutting inaccuracies often develop during use which necessarily decrease machine production and efficiency. Furthermore, even should the principles of a side lock and/or a threaded-shank tool holder not prove to be amenable of combination with a roll-rock type or roll-lock type chuck employing a slotted collet, it would still be desirable to improve the manner in which the slotted collet of such a chuck is compressed. Particularly, in the conventional roll-rock type and the BIG-SHEPARD roll-lock type chucks there are approximately 300 needle roller rolls each approximately 0.08 inches diameter, which are each operating under compression loads as great as 90 pounds. The needle roller rolls are in such great multiplicities that they cumulatively permit forces in the order of 27,210 pounds in respect of the whole tightening nut. However, 90 pounds is tremendous individual stress upon these minute needle roller rolls, which correspondingly exhibit an abbreviated service life. Accordingly, it would be desirable if some means of compressing a slotted collet could be provided which did not place such large loads on such small bearings.

An improved chuck should have a large shrinkage allowance. A large shrinkage allowance is important to readily accommodate the differing tolerances in the shank diameters of tools, especially those made upon the shop floor. An improved chuck should exhibit high rigidity without excessive physical size and mass. The run out accuracy of a tool positioned within such a chuck should be good. The collet and gripping power of the chuck should not be adversely affected by a shank which is coated with oil. These requirements and others are addressed by the tool holder in accordance with the present invention.

SUMMARY OF THE INVENTION

The present invention is embodied in a tool holder, or chuck, having a slotted collet exhibiting a formed or contoured external surface which cooperates with a complementary formed internal surface of the tool holder to compress the collet during relative rotational movement of the collet within the tool holder. The formed contour of the collet's exterior surface results from variations in its radius circumferentially around the collet, which radial variations are equal at all axial displacements for each fixed angle of arc. In the chuck of the present invention the radius of the collet varies with angular displacement circumferentially about the collet, but is everywheres equal axially along the collet for any fixed angular displacement. In prior art frusto-conical chucks the radius of the collet varies axially along the collet, but is everywheres equal angularly about the collet for any fixed axial displacement.

Specifically, the external surface of the chuck's collet in accordance with the present invention is formed or contoured comprising a plurality of cam surface segments disposed circumferentially around the collet. Each of the cam surface segments increases, nominally uniformly, from a lessor to a greater radius relative to the central axis of the chuck and of the collet. The collet cooperates with a tightening sleeve of the tool holder having interior cam surface segments which are complementary in numbers and in contour to the exterior cam surface segments of the collet. Selective rotation of the tightening sleeve relative to the collet causes selective engagement of the complementary cam surface segments of the sleeve and the collet. This causes selective compression of the collet about the shank of a cutting tool to selectively hold within, or release the cutting tool from the tool holder.

Further in accordance with present invention, the collet's interior axial aperture, which may be cylindrical for gripping a completely cylindrical straight shank, is preferably formed having a non-cylindrical or formed configuration. This non-cylindrical configuration again presents a cam surface which again consists of a plurality of substantially identical cam surface segments. These cam surface segments engage complementary shaped cam surface segments formed on the shank of a tool which is received within the collet's central aperture. By interaction of the cam surface segments the tool is indexed in position and locked for the transmission of great torque, as well as being gripped with great force by the tightened slotted collet.

The cam actuated collet tool holder, or chuck, in accordance with the present invention exhibits a predetermined shrinkage allowance which is substantially determined by the slope of the complementary cam surface segments upon both the exterior of the collet and the interior of the tightening sleeve. When this slope is set to a nominal value which is sufficiently large so as to encompass most normal variations in tool shank diameter, then the cam actuated collet with exhibit a uniform very high gripping power on tool shanks throughout the range of variation.

Moreover, this very high gripping power is realized, in the preferred embodiment, by a rotation of the tightening sleeve relative to the collet of less than 90 degrees. The wall thickness of the entire cam actuated collet and its sleeve is uniformly high, and the tool holder formed by such collet and sleeve exhibits high rigidity. Because all movements during tightening are rotational, and not axial, a tool may be readily located at a precise depth within the collet—including by rotation of a double threaded screw threading a bore on the butt end of the tool shank—and subsequently be maintained at this precise depth during tightening of the chuck. Run out accuracy is excellent due to the low positional distortion induced by the slotted-type collet. The slotted-type collet retains its normal high resistance to oil film upon the tool shank. Finally, the large cam surfaces are very durable, and the chuck has a long operational life.

BRIEF DESCRIPTION OF THE DRAWINGS

These and other aspects of the present invention will become increasingly clear upon reference to the drawings and accompanying specification wherein:

FIG. 1 is a perspective view showing a preferred embodiment of a cam actuated collet tool holder in accordance with the present invention in operation for gripping a tool.

FIG. 2 is an exploded perspective view showing the preferred embodiment of the cam actuated collet tool holder in accordance with the present invention, and a preferred embodiment of a tool which it grips.

FIG. 3 is a cross sectional view showing a cam actuated collet within the preferred embodiment of a cam actuated collet tool holder in accordance with the present invention.

FIG. 4 is a cross sectional view of a tightening sleeve within the preferred embodiment of the cam actuated collet tool holder in accordance with the present invention.

FIG. 5 is a cross sectional view of a preferred embodiment shank for a tool gripped by the cam actuated collet tool holder in accordance with the present invention.

DESCRIPTION OF THE PREFERRED EMBODIMENT

Figure 6:
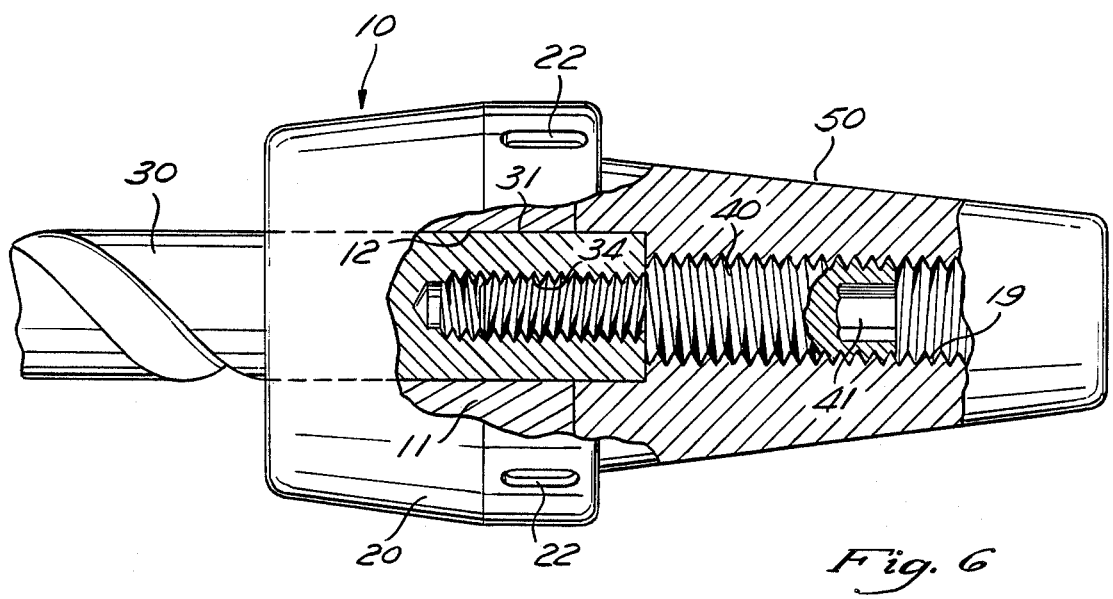
FIG. 6 is a side view, partially cut away, showing a double ended screw by which a tool may be adjusted for depth within the preferred embodiment of the cam actuated collet tool holder in accordance with the present invention.

A preferred embodiment of a cam actuated collet tool holder, or chuck, 10 in accordance with the present invention is generally shown in part of FIGS. 1 through 6. The chuck 10 is generally cylindrical in shape and has a generally cylindrical axial central aperture 12 therethrough. As is conventional, the chuck 10 holds or grips a cutting tool 30 within its aperture 12 by contacting the shank portion 31 of such tool. The chuck 10 is controllable for gripping, and for releasing, the tool 30 in a unique non conventional manner to be described in detail hereinafter.

The detailed construction of the preferred embodiment of the chuck 10 in accordance with the present invention is shown in exploded view in FIG. 2. A substantially cylindrical collet 11 exhibits a substantially cylindrical axial central aperture 12. Around such aperture 12 are a multiplicity of deep axial slots 13, each of which proceeds from the central aperture 12 to a corresponding one of an equal multiplicity of circumferentially disposed axial apertures 14. If the collet 11 is strongly compressed then the axial slots 13 will narrow in the separation of their sidewalls, and the internal diameter of central aperture 12 will diminish. This permits the shank 31 of a tool 30 to be selectively gripped and held within the aperture 12.

In accordance with the present invention, the manner by which the collet 11 is compressed for holding the tool shank 31 in its central aperture 12 is by a formed, contoured cam surface upon its exterior circumference. This cam surface is comprised of a plurality, normally four, cam surface segments 15a-d. Each of the cam surface segments 15a-d may be substantially identical and preferably are formed having an increasing radius from the centerline axis of the collet 11. However the cam surface 15a-d may additionally be formed having differing numbers and differing formed configurations for harmonic balance during machining operations. Thus each substantially identical one of the cam surface segments 15a-d subtends 90 degrees of arc of the exterior circumference of collet 11. Each of the cam surface segments 15a-d is everywheres upon its surface entirely parallel to the central axis to the collet 11, to the aperture 12, and to the chuck 10. The cam surface segments 15a-d vary from a greater to a lessor radius with angular displacement about this central axis. The variation is proportional to angular displacement about the central axis and typically the difference in radius exhibited by cam surfaces 15a-d is approximately 0.002 inches (which difference is therefore shown exaggerated in the Figures), although this difference may be increased if desired.

The collet 11 is inserted within and cooperates with a tightening sleeve 20 which is rotatably mounted to the tapered shank portion 50 of the tool holder 10 (shown in FIG. 6). This sleeve 20 exhibits a cam surface upon the circumference of its axial central interior aperture. This cam surface is complementary in number of cam surface segments, and in the shape and general size and contour of these cam surface segments, to the cam surface of collet 11. Particularly, the interior cam surface of tightening sleeve 20 is preferably comprised of four cam surface segments 21a-d, each of which is 90 degrees in arcuate extent which circumferentially around the interior aperture of tigthening sleeve 20. The exterior cam surface segments 15a-d of collet 20, and their complementary interior cam surface segments 21a-d of tightening sleeve 20, are respectively observable in cross sectional view in FIGS. 3 and 4. The tightening sleeve 20 also presents a plurality of notches or recess 22 disposed regularly around its exterior circumference which serve as gripping slots for a conventional spanner wrench (not shown).

In operation to grip the tool 30, the preferred embodiment of the cam actuated collet tool holder, or chuck, 10 in accordance with the present invention receives the shank 31 of the tool 30 into the aperture 12 of the collet 11 as depicted in FIG. 1 and 6. The tool 30 may be inserted to variable depth as desired. It should be understood that the shank 31 could be completely cylindrical and straight and that the aperture 12 of the collet 11 would correspondingly also be completely cylindrical and straight. The manner by which the aperture 12 to collet 11, and the shank 31 to tool 30, might preferably exhibit other than cylindrical surfaces, as is illustrated, will be discussed later. When the tool 30 is inserted within the chuck 10 to a desired depth then it may, optionally, be temporarily held at desired depth therein by tightening of an optional threaded setscrew 16. The setscrew 16 threads the transverse aperture 17 within the sidewall of collet 11. Access to the setscrew 16 may, or may not, be obtained through an aperture correspondingly positioned within the tightening sleeve 20. If there is no aperture within the tightening sleeve 20, as is the illustrated case, then if an optional setscrew 16 is employed, then the tightening sleeve 20 must be slid actually over the tool 30 and onto the collet 11 only after the setscrew 16 has been tightened. The setscrew 16 should be understood to have negligible relationship to the strong gripping to be performed by the chuck 10 in accordance with the present invention, and is merely utilized to temporarily hold the tool 30 at a precision depth which will thereafter be maintained during tightening as well as eliminate any twisting or rotation of the tool 30 within the tool holder 10.

In order to tighten a tool 30 in the chuck 10 the tightening sleeve 20 is rotated relative to the collet 11. This rotation causes the interior cam surface segments 21a-d of the collet 20 to ramp against the corresponding cam surface segments 15a-d of the collet 11. The tightening collet 20 may be aided to be rotated relative to the collet 11 by a spanner, or torqueing tool, which is temporarily affixed to oppositely opposed ones of the exterior apertures 22 and used to rotate the tightening collar 20 by a rotational torque applied to the collet at the locations of such opposed apertures 22.

The selective rotation of tightening sleeve 20 causes selective ramping of the cam surface segments 21a-d relative to their complementary cam surface segments 15a-d, which in turn causes selective radial compression of the collet 11. This radial compression selectively narrows the slots 13 and causes a reduction in the diameter of the axial interior aperture 12. This reduction in diameter grips the shank 31 of tool 30 and holds in under great pressure within the collet 11 of the chuck 10. The direction of rotation of tightening sleeve 20 relative to collet 11 may be reversed in order to diminish the engagement of the cam surface segments, release the compression of collet 11, and correspondingly ungrip the tool 30.

It should be considered that in the tightening of chuck 10 the tightening sleeve 20 needs never be rotated more than 90 degrees relative to collet 11 in order to obtain maximum compression. The amount of compression obtained, and the mechanical advantage of the slopng cam surfaces used to obtain such compression, is obviously a function of the circumference of the collet 11 and the gradient by which the cam surface segments 15 vary in radius about the central axis of the collet 11. If the central aperture 12 fits a nominal 1.25 inch diameter shank 31 to a tool 30, then the diameter of collet 11 is approximately 3 inches giving a circumference of nearly 10 inches. A single cam surface segment 15 occupying a quarter of this circumference subtends approximately 2.5 inches of arc. Within this 2.5 inch distance the cam surface segment incurs a nominal "rise", or increased radius about the central axis, of approximately 0.002 inches. The mechanical advantage is correspondingly very high.

Additionally, the total 2.5 inches nominal extent of the cam surface segments compares favorably to the length of the frustoconical tapers by which prior art roll-rock type and roll-rock type chucks obtain compressive force. When the diameter of tool 30, and the corresponding diameter of the chuck 10, is very large then the mechanical advantage obtained by the correspondingly large cam surfaces in accordance with the present invention is much superior to the mechanical advantage obtained along frustoconical surfaces of a conventional chuck.

Finally, it should be noted that there are no bearings between the broad, coaxial, cam surface segments 15a-d and 21a-d. These camming surfaces are hard and axially straight, and are substantially impervious to wear during normal operation of the chuck. Appropriate lubricants may be employed between the camming surface segments to further aid in ease of tightening and reduction of wear.

In accordance with still another, separate and severable, aspect of the present invention the central aperture 12 to the collet 11 is preferably not perfectly cylindrical, but rather itself exhibits a cam surface. This cam surface is again comprised of a plurality of cam surface segments. Particularly as illustrated in FIG. 2, there are preferably three cam surface segments 18a-c upon the circumference of internal bore 12 to collet 11. These cam surface segments 18a-c are separated one to the next by arcuate cylindrical sectors of the substantially cylindrical aperture 12, which cylindrical sectors exhibit a constant radius from the aperture's axis. Thus the cam surface segments 18a-c are not contiguous. The cam surface segments 18a-c are everywhere parallel to the central axis of the aperture 12, the collet 11, and the chuck 10. The cam surface segments 18a-c preferably exhibit a semi-circular contour as illustrated. This contour has a radius from the aperture's axis which first diminishes and then increases with angular displacement about the aperture's axis. The cam surface segments 18a-c engage complementary relieved areas, or cam surface segments, 33a-c on the shank 31 of tool 30. A cross-sectional view of the shank 31 of tool 30 showing such cam surface segments 33a–c is shown in FIG. 5. It should be noted that a tool 30 exhibiting such cam surface segments 33a–c would still be grippable by, and usable within, a standard chuck for gripping a completely straight and cylindrical tool shank.

The cam surface segments 18a–c upon the internal axial aperture 12 to collet 11 interact with the complementary cam surface segments 33a–c upon the shank 31 to tool 30 to prevent the rotation of the tool within the collet similarly to conventional side lock holders and threaded shank holders. This resistance to rotation of the tool 30 relative to the chuck 10 is in addition to the resistance to rotation provided by the gripping force upon tool 30 provided by the compression of collet 11.

A tool holder, or chuck, constructed and operated in accordance with the present invention presents several advantages. The gripping force is very high, and becomes still higher as the radius of the chuck increases. Runout accuracy is excellent both in radial and axial positioning. The radial runout at the working face of the tool is high because the tool is gripped evenly from all sides within the collet and experiences no off-axis forces. The collet is not prone to distortion of its axis by the manner in which it is tightened. The tool experiences no appreciable axial forces during tightening and its axial positioning within the chuck is maintainable with high precision.

The wall of both the collet 11 and the tightening sleeve 20 are substantially uniform but may be dimensioned as is desired to impart rigidity. Particularly, it should be understood that the very slight external frustoconical taper to tightening sleeve 20 and chuck 10 visible in FIGS. 1 and 2 is not indicative of any conventional frustoconical surfaces at the interior of the chuck. Rather the external taper is to allow easy fitting of a tightening spanner to the apertures 22 of tightening sleeve 20, and to make the chuck 10 more visually similar to prior art chucks. Obviously the chuck 10 could be a straight cylinder in external appearance, and the apertures 22 by which tightening sleeve 20 is turned might well be axially centered at the exterior of such tightening sleeve 20 instead of occupying a position proximate the proximal end thereof as shown in FIGS. 1 and 2. The substantially uniform, substantially axially invariant, thick walls of collet 11 and tightening sleeve 20 provide superior rigidity. There is no part of the chuck in accordance with the present invention which is more highly stressed, and therefore prone to distort or break, then any other part. The broad camming surface segments, which may be hardened and protected by lubricants, exhibit excellent durability. It is nearly impossible to break the chuck by overtightening, which cannot be said for prior art chucks.

Further in accordance with the present invention, a means by which the shank 31 of cutting tool 30 may be precisely axially located within the central aperture 12 of collet 11 and eliminate any back-out of the tool 30 from the tool holder 10 is shown in FIG. 6. An oppositely-threaded (opposite thread pitch) double-ended screw, or bolt, 40 threads at one end a threaded bore 34 (shown in FIG. 5) which is formed in the butt end of shank 31 to tool 30. The other end of double-ended screw 40 threads a threaded bore 19 which extends axially entirely throughout the length of the tapered shank 5 of the tool holder 10. Access may be obtained through bore 19 to a cavity adapted for coupling rotational torque, normally a hexagonal shaped cavity 41 formed in the end of double-ended screw 40. When the double-ended screw 40 is turned by a tool, nominally an allen wrench, which is inserted through bore 19 into cavity 41, then the action of its opposite threads will cause shank 31 and tool 30 to be progressively axially positioned within central aperture 12 to collet 11. When the tool 30 is properly positioned then the optional setscrew 16 may be tightened, or the tightening sleeve 20 may be immediately rotated to compress the collet 11 and grasp the tool 30 therein. By this sequence the operating extension of a tool may be adjusted, and maintained during tightening. In accordance with the present invention the tightening introduces no appreciable axial displacement force on tool 30, which may be positioned in depth with great precision.

In accordance with the preceding discussion, certain variations and adaptations of the present invention will be perceived to be possible without departing from the true scope and spirit of the invention. For example, the numbers of the pluralities of the cam surface segments both upon the exterior circumference of collet 11, and (optionally) about its interior bore 12, could be varied. The variation in radius and the detailed contour of such cam surface segments could likewise be varied. Further, those skilled in the art, will recognize that the tool holder and its concepts are applicable to other machines such as lathes, milling machines or special machines. In addition, those skilled will recognize that the present invention may be incorporated directly into conventional machine spindle constructions as opposed to being formed as a separate, holder mounted into such spindles. In accordance with these and other possible variations, the present invention should be interpreted in accordance with the following claims, only, and not solely in accordance with that preferred embodiment of a cam actuated collet tool holder, or chuck, within which the invention has been taught.

What is claimed is:

1. A chuck for use on a machine tool spindle comprising:
    a collet having narrow axial slots about an interior axial aperture which is sized to receive a tool shank, and having an exterior cam surface which cam surface is everywheres parallel to the aperture's axis;
    a tightening sleeve positioned about the collet having an interior cam surface complementary to the exterior cam surface of the collet;
    wherein selective rotation of the tightening sleeve relative to the collet causes selective engagement of the complementary cam surfaces which causes selective compression of the collet to grasp the shank of a tool disposed in the axial aperture and
    wherein said collet's internal axial aperture is formed having an interior cam surface complementary to an exterior cam surface formed on the tool shank.

2. The chuck according to claim 1 wherein the collet's exterior cam surface comprises:
    a plurality of substantially identical cam surface segments.

3. The chuck according to claim 2 wherein the cam surface segments are formed adjacent to one another.

4. The chuck according to claim 3 wherein the plurality of cam surface segments comprises four.

5. The chuck according to claim 2 wherein each of the plurality of cam surface segments increases uniformly from a lessor to a greater radius relative to the aperture's axis.

6. The chuck according to claim 5 further comprising a threaded aperture and fastener extending radially through said collet and into said interior axial aperture.

7. A method of tightening a chuck about a tool shank comprising:

inserting a tool shank axially into a central interior axial aperture of a collet of a chuck;

fixing the depth of the axial insertion of the tool shank into the aperture by tightening a transversely mounted set screw within the collet; and rotating a tightening sleeve located around the collet relative to the collet so that a collet exterior cam surface which is everywheres parallel to the aperture's axis is ramped against a complementary tightening sleeve interior cam surface which is also everywheres parallel to the aperture's axis;

wherein the ramping of the complementary cam surfaces compresses the collet which compressively tightens about the tool shank.

8. The method according to claim 7 which between the inserting and the fixing step further comprises:

adjusting the depth of the axial insertion of the tool shank into the aperture by drawing the tool shank by its butt end which is inserted within the aperture.

9. The method according to claim 8 wherein the adjusting by drawing further comprises:

drawing the tool shank by a screw engaging a threaded bore which is within the butt end.

* * * * *